(12) United States Patent
Vuolle-Apiala et al.

(10) Patent No.: US 8,629,591 B2
(45) Date of Patent: Jan. 14, 2014

(54) ELECTROMECHANICAL DEVICE

(75) Inventors: Tuomas Vuolle-Apiala, Jyväskyla (FI);
Jorma Tirkkonen, Jyväskylä (FI); Ville Pakarinen, Jyväskylä (FI); Jari Toikkanen, Muurame (FI); Olli Liukkonen, Lappeenranta (FI); Jorma Mustalahti, Hyvinkää (FI); Ilkka Martikainen, Lappeenranta (FI)

(73) Assignee: Moventas Gears Oy, Jyvaskyla (FI)

( * ) Notice: Subject to any disclaimer, the term of this patent is extended or adjusted under 35 U.S.C. 154(b) by 0 days.

(21) Appl. No.: 13/102,904

(22) Filed: May 6, 2011
(Under 37 CFR 1.47)

(65) Prior Publication Data

US 2011/0273064 A1    Nov. 10, 2011

(30) Foreign Application Priority Data

May 6, 2010   (EP) ..................... 10162076

(51) Int. Cl.
    *H02K 7/06* (2006.01)
(52) U.S. Cl.
    USPC .......................... 310/75 R; 310/83
(58) Field of Classification Search
    USPC ............... 310/75 R, 83, 112–114, 67 A, 75 C
    See application file for complete search history.

(56) References Cited

U.S. PATENT DOCUMENTS

| | | | |
|---|---|---|---|
| 2,436,930 A | 3/1948 | Mackmann | |
| 3,153,158 A * | 10/1964 | Louise et al. | 310/83 |
| 3,310,691 A * | 3/1967 | Wilkinson | 310/83 |
| 3,812,928 A | 5/1974 | Rockwell et al. | |
| 4,467,230 A * | 8/1984 | Rovinsky | 310/83 |
| 4,505,031 A | 3/1985 | Colwell et al. | |
| 4,531,428 A | 7/1985 | Windish | |
| 4,922,164 A | 5/1990 | Jacobsen et al. | |
| 4,955,128 A | 9/1990 | Sogabe et al. | |
| 5,053,661 A * | 10/1991 | Kitamura et al. | 310/83 |
| 5,087,229 A * | 2/1992 | Hewko et al. | 475/149 |
| 5,246,082 A * | 9/1993 | Alber | 180/65.51 |
| 5,272,938 A * | 12/1993 | Hsu et al. | 74/594.1 |

(Continued)

FOREIGN PATENT DOCUMENTS

| | | |
|---|---|---|
| CN | 101426661 A | 5/2009 |
| CN | 101865084 A | 10/2010 |

(Continued)

OTHER PUBLICATIONS

U.S. Appl. No. 13/102,735, filed May 6, 2011.

(Continued)

*Primary Examiner* — Dang Le
(74) *Attorney, Agent, or Firm* — Birch, Stewart, Kolasch & Birch, LLP

(57) ABSTRACT

An electromechanical device having a mechanical interface structure for connecting to an external rotating element, an electrical machine, and one or more gear stages on a mechanical power transmission path between the mechanical interface structure and a rotor of the electrical machine. The rotor of the electrical machine is supported by the frame of the gear stage directly connected to the rotor.

7 Claims, 2 Drawing Sheets

(56) References Cited

U.S. PATENT DOCUMENTS

| | | | |
|---|---|---|---|
| 5,770,904 A | 6/1998 | Rasch et al. | |
| 6,100,615 A * | 8/2000 | Birkestrand | 310/75 C |
| 6,133,659 A | 10/2000 | Rao | |
| 6,278,216 B1 * | 8/2001 | Li | 310/424 |
| 6,515,399 B1 | 2/2003 | Lauf et al. | |
| 6,756,719 B1 * | 6/2004 | Chiu | 310/257 |
| 6,864,607 B2 * | 3/2005 | Hashimoto | 310/75 R |
| 6,944,906 B2 * | 9/2005 | Moein et al. | 15/250.3 |
| 7,057,327 B2 | 6/2006 | Kanazawa et al. | |
| 7,077,776 B2 | 7/2006 | Sorab et al. | |
| 7,649,286 B2 * | 1/2010 | Manning | 310/41 |
| 7,815,536 B2 | 10/2010 | Jansen et al. | |
| 2002/0077209 A1 | 6/2002 | El-Antably et al. | |
| 2004/0160058 A1 | 8/2004 | Gott et al. | |
| 2006/0223665 A1 | 10/2006 | Matsushita et al. | |
| 2009/0025991 A1 | 1/2009 | Moriguchi et al. | |
| 2009/0114480 A1 | 5/2009 | Madge et al. | |
| 2010/0007151 A1 | 1/2010 | Ciszak et al. | |
| 2010/0052442 A1 | 3/2010 | Savant | |
| 2010/0062888 A1 | 3/2010 | Ciszak et al. | |
| 2010/0133854 A1 | 6/2010 | Jansen et al. | |
| 2010/0164232 A1 | 7/2010 | Siegfriedsen | |

FOREIGN PATENT DOCUMENTS

| | | |
|---|---|---|
| DE | 85 13 219 U1 | 5/1986 |
| DE | 41 34 553 A1 | 3/1992 |
| DE | 10 2007 012 408 A1 | 9/2008 |
| EP | 0 538 743 A2 | 4/1993 |
| EP | 0 811 764 A1 | 12/1997 |
| EP | 1 905 633 A1 | 4/2008 |
| EP | 2 088 316 A2 | 8/2009 |
| EP | 2 216 547 A2 | 8/2010 |
| FR | 2 824 965 A1 | 11/2002 |
| JP | 2009-148035 A | 7/2009 |
| WO | WO-02/095900 A1 | 11/2002 |
| WO | WO 03/031812 A1 | 4/2003 |
| WO | WO 04/001932 A1 | 12/2003 |
| WO | WO 2005/117242 A1 | 12/2005 |
| WO | WO 2006/011513 A1 | 11/2006 |
| WO | WO 2007/051895 A1 | 5/2007 |
| WO | WO 2011/133024 A2 | 10/2011 |

OTHER PUBLICATIONS

U.S. Appl. No. 13/102,587, filed May 6, 2011.
U.S. Appl. No. 13/102,519, filed May 6, 2011.

* cited by examiner

ELECTROMECHANICAL DEVICE

FIELD OF THE INVENTION

The invention relates to an electromechanical device that is a combination of one or more gear stages and a rotating electrical machine. More precisely the invention relates to a construction and structure of this kind of an electromechanical device.

BACKGROUND

In many power generating systems it may be advantageous from the viewpoints of various design and constructional aspects to connect a generator to a prime mover, e.g. a wind turbine, via a gear-box arranged to convert the rotational speed of the prime mover into a speed range suitable for the generator. Correspondingly, in many motor applications it may be advantageous to connect an electrical motor to an actuator via a gear box arranged to convert the rotational speed of the electrical motor into a speed range suitable for the actuator. The gear-box may comprise one or more series of connected gear stages with the aid of which a desired gear ratio is achieved. Each single gear stage can be, for example, a planet-gear stage or a cylindrical gear stage.

Challenging design aspects related to a combination of a gear-box and an electrical machine that can be a generator and/or a motor are, among others, the size and weight of the combination. Furthermore, equipment needed for lubricating, cooling, and monitoring the combination of the gear-box and the electrical machine may be complex compared with that of e.g. a gearless system.

In many special applications, such as in wind turbines for example, the size and weight of the combination of an electrical machine, such as a generator or an electrical motor, and a gear box is of a critical importance, since these features affect many other design aspects directly related to this combination. These include, among others, the support structure for the combination as well as required space for the combination.

Therefore, there is a great demand for smaller and lighter combinations of a gear-box and an electrical machine.

It should also be noted, that an electrical machine in the context of the present application may be a generator or an electrical motor.

SUMMARY

In the present invention the weight and size of the electromechanical device consisting of a gear-box having one or more gear stages and of an electrical machine, is advantageously minimized with an integrated construction of the electromechanical device.

An electromechanical device in accordance with the present invention comprises:
- a mechanical interface structure for connecting the electromechanical device to an external rotating element,
- an electrical machine, such as a generator or an electrical motor,
- one or more gear stages on a mechanical power transmission path between the mechanical interface structure and a rotor of the electrical machine, and
- a mechanical structure connected fixedly to the outer frame of the gear stage connected to the rotor, and to which mechanical structure the rotor is connected rotatably.

In the solution in accordance with the present invention the gear-box and the electrical machine are integrated in a single unit, where the rotor of the electrical machine is supported by the outer frame of the gear stage connected to the rotor. This way the load and forces created by the weight and rotation of the rotor of the electrical machine are conveyed directly to the support structure of the gear stage connected directly to the rotor instead of the frame of the electrical machine, as in prior art solutions. In other words, the gear stage connected to the rotor and the rotor itself forms a single load bearing entity.

The supporting of the rotor by outer frame of the gear stage directly connected to the rotor means in the context of the present invention a solution, where the rotor is carried by and rotatable connected to a mechanical structure, which mechanical structure is fixedly connected to, or is part of, the outer frame of the gear stage.

Also, in an advantageous embodiment of the present invention, where the electromechanical device comprises two or more gear stages, the support structure of the stator of the electrical machine is fixedly connected to the outer frame of a gear stage not directly connected to the rotor. This way the supporting forces of the stator are conveyed to the supporting structure of another stage of the mechanical power transmission path thereby creating a single load bearing entity.

The solution in accordance with the present invention allows more compact and light-weight construction of an electromechanical device, where the gear stages are at least partially integrated to the structure of the electrical machine, and where the supporting forces of the electrical machine are conveyed to the frame of the gear stages. This allows for direct conveying of these supporting forces from within the electromechanical device to the external mechanical supporting structures.

The present invention also makes it possible to combine the lubrication system of the one or more gear stages of the mechanical power transmission path with the lubrication of the electrical machine. This is advantageously done by combining the lubrication spaces of the gear stage or stages with lubrication space of the electrical machine with lubricant channels provided in the mechanical structure connected fixedly to the outer frame of the gear stage connected to the rotor, and to which mechanical structure the rotor is connected rotatably.

The present invention is very suitable for wind turbines, which usually consists of two planet gear stages and a generator.

In the characterizing part of claim 1 is disclosed more precisely the features that are characterizing to the solution in accordance with present invention. Other advantageous embodiments are disclosed in dependent claims.

BRIEF DESCRIPTION OF THE FIGURES

The exemplifying embodiments of the invention and their advantages are explained in greater detail below in the sense of example and with reference to the accompanying drawings, in which.

DESCRIPTION OF THE EMBODIMENT

Figure 1:
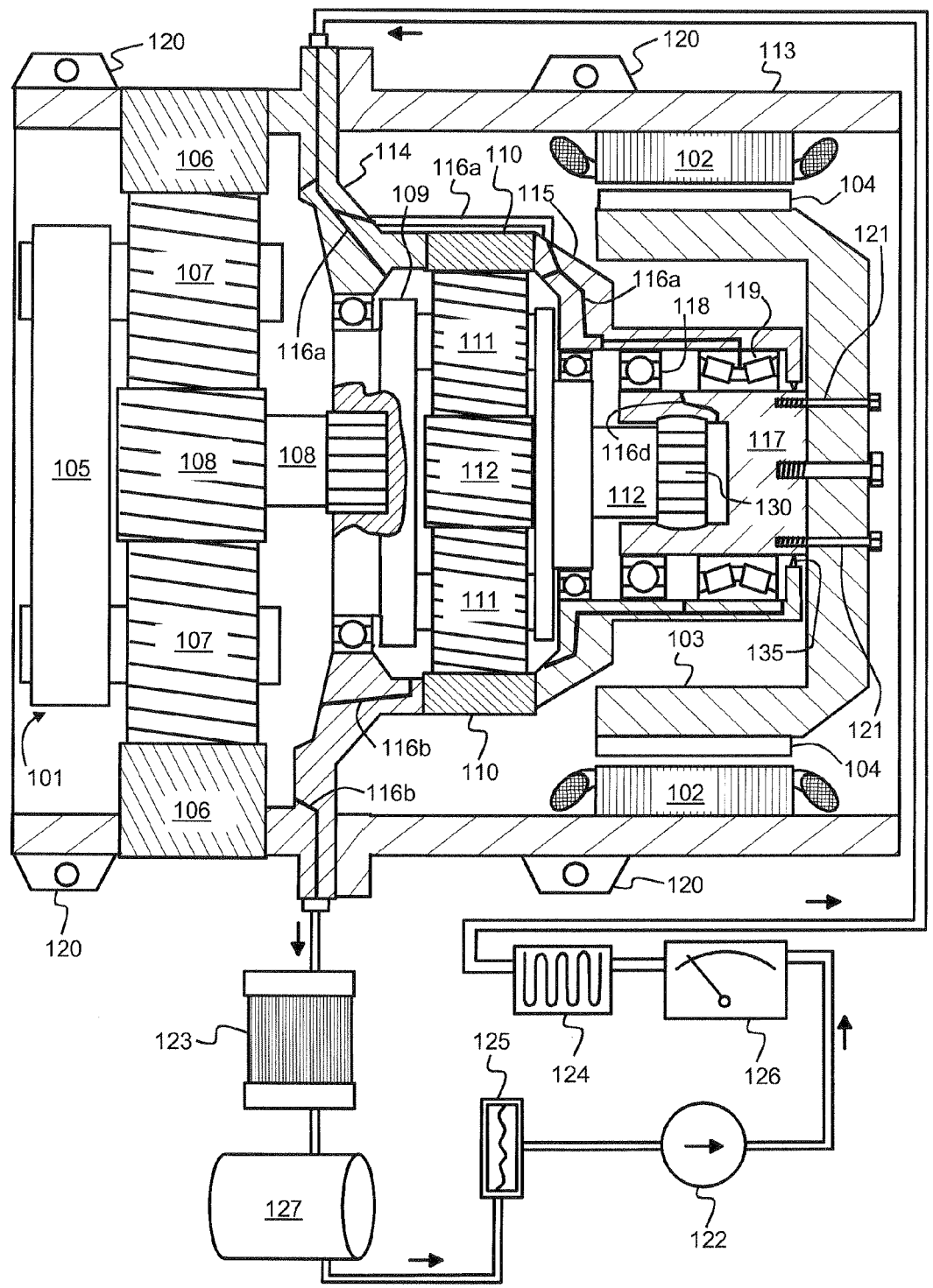
FIG. 1 shows a schematic section view of an electromechanical device according to an embodiment of the invention.

FIG. 1 shows a schematic section view of an electromechanical device according to an advantageous, exemplifying embodiment of the invention. The electromechanical device comprises a mechanical interface structure 101 for connecting to an external rotating element that can be, for example but not necessarily, a wind turbine. The electromechanical device comprises an electrical machine for converting mechanical power into electrical power or vice versa. The electrical machine comprises a laminated stator core 102 that is provided with stator windings. The electrical machine comprises a rotor that includes a central part 117, a frame 103, and permanent magnets 104 mounted on the outer surface of the frame. Naturally, it is also possible that the central part 117 and the frame 103 are a single, monolithic piece. The electromechanical device comprises one or more gear stages on a power transmission path between the mechanical interface structure and the rotor of the electrical machine. The gear stages are arranged to convert the rotational speed of the external rotating element, e.g. a wind turbine, to a speed range suitable for the electrical machine. The electromechanical device comprises mechanical structures 113, 114, and 115 that are arranged to support the elements of the gear-stages and the elements of the electrical machine.

The mechanical structures 113, 114 and 115 constitute a common lubricant oil room for both the gear stages and the electrical machine. In the electromechanical device, there are oil channels 116a for directing at least a part of lubricant oil circulated in the electromechanical device to flow via the gear stages and at least a part of the lubricant oil to flow via bearings 118 and 119 of the electrical machine. Oil channels 116b are arranged to remove the lubricant oil from the electromechanical device so as to make circulation of the lubricant oil possible. The bearings shown in FIG. 1 are rolling bearings. It should be, however, noted that any of the bearings could be a sliding bearing as well, or any other type of suitable bearings. The manner, how the lubricant oil is divided into the part flowing via the gear stages and into the part flowing via the bearings of the electrical machine, depends on the arrangement of the oil channels. The oil channels may be arranged, for example, in such a manner that the lubricant oil flows first via the gear stages and then via the bearings of the electrical machine, or in such a manner that there are parallel flowing routes for the gear stages and for the electrical machine, or there can be a hybrid of these. The electromechanical device described above and illustrated in FIG. 1 is actually a combination of one or more gear stages and an electrical machine integrated into a single unit and utilizing a common lubricating system. Therefore, the lubricating system can be simpler and more reliable than that of a traditional arrangement in which there is a separate gear-box unit and a separate electrical machine unit connected to each other. Furthermore, the size and the weight of the above-described electromechanical device can be smaller than the size and the weight of the above-mentioned traditional arrangement.

In the electromechanical device according to the exemplifying embodiment of the invention illustrated in FIG. 1, the gear stages consists of a first planet-gear stage and a second planet-gear stage. The first planet-gear stage comprises a planet-wheel carrier 105, a gear ring 106, planet wheels 107, and a sun gear shaft 108. The second planet-gear stage comprises a planet-wheel carrier 109, a gear ring 110, planet wheels 111, and a sun gear shaft 112. The planet-wheel carrier 105 of the first planet-gear stage constitutes a part of the mechanical interface structure 101 arranged to receive the mechanical power from the prime mover. Therefore, the planet-wheel carrier 105 of the first planet-gear stage is rotated by the prime mover. The gear ring 106 is stationary. The sun gear shaft 108 of the first planet-gear stage is connected to the planet-wheel carrier 109 of the second planet-gear stage. Therefore, the planet-wheel carrier 109 of the second planet-gear stage is rotated by the sun gear shaft 108 of the first planet-gear stage. The gear ring 110 is stationary. The sun gear shaft 112 of the second planet-gear stage is connected with a coupling 130 to the central part 117 of the rotor of the electrical machine. The coupling 130 is advantageously cambered so as to allow certain misalignment between the rotational axes of the sun gear shaft 112 and the central part 117 of the rotor of the electrical machine. Thus, the coupling 130 can be arranged to remove the additional loading which would be otherwise caused by the possible misalignment to the bearings 118 and 119. Furthermore, the coupling 130 allows changes in the alignment during operation. The central part 117 of the rotor comprises an oil-channel 116d for delivering lubricant oil to the coupling 130. Therefore, the rotor of the electrical machine is rotated by the sun gear shaft 112 of the second planet-gear stage. The planet gear stages have, preferably but not necessarily, floating sun gear shafts 108 and 112 and cambered couplings between the sun gear shaft 108 and the planet-wheel carrier 109 and the sun gear shaft 112 and the central part 117 in order to provide tolerance against possible mutual deviations between directions of the rotational axes of the sun gear shafts 108 and 112, and of the rotor of the electrical machine, i.e. to provide tolerance against possible alignment non-idealities. In the electromechanical device shown in FIG. 1, the sun gear shaft 112 of the second planet-gear stage is floating on support of the planet-wheels 111 of the second planet-gear stage and on support of the central part 117 of the rotor of the electrical machine. The sun gear shaft 108 of the first planet-gear stage is floating on support of the planet-wheels 107 of the first planet-gear stage and on support of the planet-wheel carrier 109 of the second planet-gear stage. It is, however, also possible that one or both of the sun gear shafts is/are bearing-mounted. In addition to the bearings and the gear stages, the lubrication system lubricates the coupling between the gear stages and the electrical machine, i.e. the coupling between the sun gear shaft 112 and the central part 117.

As can be seen from FIG. 1, the bearings 118 and 119 of the electrical machine support not only the rotor of the electrical machine but also the sun gear shaft 112 of the second planet-gear stage. The coupling 130 is advantageously arranged to deliver the axial forces from the gear stages to the bearings 118 and 119 that are common to the gear stages and the electrical machine. Hence, the bearings 118 and 119 are used for supporting not only the rotor of the electrical machine but also at least partly the second gear stage. Therefore, the number of bearings can be smaller than in a traditional arrangement in which there are a separate electrical machine unit and a separate gear-box unit that are connected to each other. Furthermore, the number of sealed lead-throughs for rotating shafts is reduced compared with the above-mentioned traditional arrangement. A lip seal 135 is arranged to seal the room that constitutes the common lubricant oil room for both the gear stages and the electrical machine.

An electromechanical device according to an embodiment of the invention comprises connection elements 120 on the outer surface of the electromechanical device for attaching to an external mechanical structure. The external mechanical structure can be for example a mounting platform in a machine room at the top of a tower of a wind power plant. The mechanical structures of the electromechanical device comprise a first mechanical structure 113 supporting the stator 102 of the electrical machine with respect to the connection elements, a second mechanical structure 114 supporting the gear ring 110 of the second planet-gear stage with respect to the connection elements, and a third mechanical structure 115 supporting the rotor of the electrical machine with respect to the gear ring of the second planet-gear stage. As can be seen from FIG. 1, the first mechanical structure 113 is arranged to conduct tensions caused by electromagnetic forces acting on the stator 102 of the electrical machine to the connection elements 120 so that the tensions are arranged to bypass the mechanical structures supporting the second gear stage and the rotor. Therefore, the tensions caused by the forces acting on the stator due to e.g. electrical transients are conducted directly from the stator 102 to the connection elements 120 and thereby to the external mechanical structures.

In the integrated embodiment of FIG. 1, the frame of the second planet-gear stage, which is directly connected to the shaft 117 of the rotor 103, is formed by fixedly mounted gear ring 110, part of second mechanical structure 114 and part of third mechanical structure 115. The frame of first planet-gear stage, which in this embodiment is directly connected to mechanical interface structure 101, is formed by fixedly mounted gear ring 106, and part of second mechanical structure 114.

In the embodiment of FIG. 1, the stationary gear ring 106 forms part of the frame of the first gear stage, and the stationary gear ring 110 form part of the frame of the second gear stage. It should be noted, that within the context of the present invention the stationary gear rings 106 and 110 can be enclosed within the frames of the gear stages, or these gear rings can be rotatable gear rings whereby they must be enclosed by the frames. Therefore, the frames of the gear stages, which in the embodiment of FIG. 1 comprise part of the mechanical structure 115 and the mechanical structure 114 in addition to the gear rings 106 and 110, may be manufactured as a single entities. Further, the frames of the first and second gear stage can advantageously be manufactured as a single piece, in a single casting, for example. This kind of single frame piece for both of the gear stages enhances the structural strength of the frame, and allows for better conveying of the forces from within the electromechanical device to the frame of the device and from there to the external mechanical structures through connection elements 120, for example. The whole of the mechanical structure 115, comprising the parts supporting the rotor 103 of the electrical machine, is advantageously part of the single frame piece of the gear stages.

Also, the mechanical structure 113 can be integrated as an integral part of the single frame entity of the gear stages, whereby the whole frame component of the electromechanical device can be manufactured as a single piece. This kind of frame, however, might not be optimal in view of manufacture, assembly and maintenance of the electromechanical device.

During operation of the electromechanical device, the rotor 103 of the electrical machine is subjected to axial and radial forces caused by the gears of the gear stages, as well as axial and radial electromechanical forces of the electrical machine. In the embodiment of FIG. 1, these axial and radial forces are transferred through bearings 118 and 119 to mechanical structure 115, which conveys these forces to the frame of the gear stage directly connected to the center 117 of the rotor. Since mechanical structure 115 is integral part of the frame of the gear stage, the supporting of the rotor 103 is not carried out by the internal structures of the electrical machine as in prior art solutions, but by the frame of the gear stage directly connected to the rotor, the forces affecting the rotor can be directly conveyed to the outer structure or frame of the electromechanical device, and from there to the external mechanical structure.

It should also be noted, that the mechanical structure 115, which is integral part of the frame of the gear stage and which supports the rotor 103 of the electrical machine, also centers the rotor in relation to the planet carrier, which gives the best load sharing in the planetary gear and minimizes the misalignment forces to bearings 118 and 119.

The forces affecting the stator 102 of the electrical machine consist mainly of electromechanical forces and gravity forces. By connecting the mechanical structure 113, which supports the stator, directly to the frame of the suitable gear stage, which is the embodiment of FIG. 1 is the first gear stage, these forces can be directly conveyed to the outer frame of the gear stage, and from there to the external mechanical structures. In this type of solution in accordance with the present invention, the fastening of the electromechanical device, especially in case of wind turbines, to external mechanical structures is mainly carried out through the frame of the gear stages, which makes separate external supporting structures for electrical machine unnecessary and in this way greatly decreases the complexity and size of required external supporting structures.

The rotor of the electrical machine can be connected to the sun gear shaft 112 of the second planet-gear stage with a safety coupling arranged to lose its grip as a response to a situation in which torque acting over the safety coupling exceeds a pre-determined limit value. With this kind of arrangement it is possible to protect the elements of the gear stages from torque spikes caused by electrical transients that may occur e.g. during a short-circuit situation. The safety coupling may comprise e.g. breaking-pins arranged to break as a response to the situation in which the torque acting over the safety coupling exceeds a pre-determined limit value. FIG. 1 depicts a system in which there are bolts 121 that may be so thin or otherwise weak that these bolts are broken when the torque exceeds the pre-determined limit value. Hence, the bolts 121 represent the above-mentioned breaking-pins. Alternatively, the safety coupling may comprise friction surfaces pressed, e.g. with springs, against each other and arranged to slip with respect to each other as a response to the situation in which the torque acting over the safety coupling exceeds the pre-determined limit value.

As can be seen from FIG. 1, the frame 103 of the rotor has a cupped shape opening towards the gear stages. The mechanical structure 115 supporting the rotor of the electrical machine is arranged to extend to the semi-closed space defined by the cupped shape and the bearings 118 and 119 of the electrical machine are located in the semi-closed space defined by the cupped shape. This allows the bearings 118 and 119 to be located near to the center of mass of the rotor and also shortens the axial length of the electromechanical device. Therefore, the axial length of the electromechanical device shown in FIG. 1 can be smaller than the total axial length of a traditional arrangement in which there are a separate electrical machine unit and a separate gear-box unit that are connected to each other.

Figure 2:
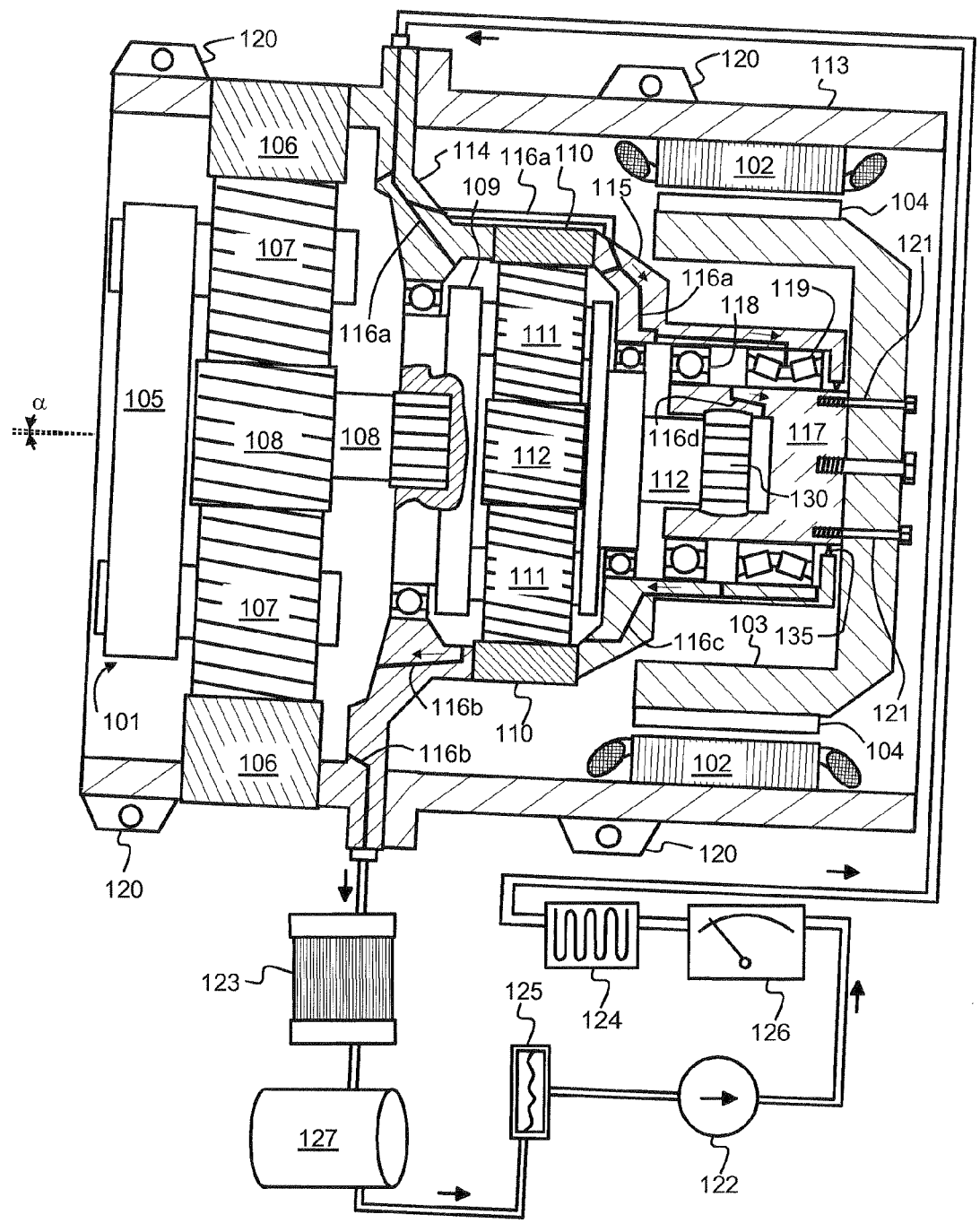
FIG. 2 shows a schematic section view of an electromechanical device according to an embodiment of the invention.

In many applications, an electromechanical device according to an embodiment of the invention is arranged to operate in a tilted position as illustrated in FIG. 2. The tilt angle α that is an angle between the axial direction of the electrical machine and a horizontal line can be, for example but not necessarily, on the range 4 . . . 6 degrees. The sun gear shaft 112 of the second planet-gear stage is connected with a coupling 130 to the central part 117 of the rotor of the electrical machine. The coupling 130 is advantageously cambered so as to allow certain misalignment between the rotational axes of the sun gear shaft 112 and the central part 117 of the rotor of the electrical machine. Thus, the coupling 130 can be arranged to remove the additional loading which would be otherwise caused by the possible misalignment to the bearings 118 and 119. Furthermore, the coupling 130 allows changes in the alignment during operation. The central part 117 of the rotor comprises an oil-channel 116d for delivering lubricant oil to the coupling 130. The coupling 130 is advantageously arranged to deliver the axial forces from the gear stages to the bearings 118 and 119 that are common to the gear stages and the electrical machine. The mechanical structure 115 comprises a return oil channel 116c that is arranged to ensure that the surface level of the lubricant oil within the mechanical structure 115 does not reach the lip seal 135 of the rotary lead-through when the electromechanical device is in the tilted position.

An electromechanical device according to an embodiment of the invention comprises an oil-pump 122 arranged to circulate the lubricant oil via the gear stages and via the bearings of the electrical machine. The electromechanical device may further comprise an oil tank 127.

An electromechanical device according to an embodiment of the invention comprises an oil cooler element 123 for cooling the lubricant oil circulating via the gear stages and the bearings of the electrical machine.

An electromechanical device according to an embodiment of the invention comprises a pre-heater element 124 for warming the lubricant oil circulating via the gear stages and via the bearings of the electrical machine.

An electromechanical device according to an embodiment of the invention comprises a filter element 125 for removing impurities from the lubricant oil.

An electromechanical device according to an embodiment of the invention comprises a sensor element 126 for monitoring the condition of the lubricant oil. The sensor element can be responsive, for example, to the temperature of the lubricant oil, the purity degree of the lubricant oil, and/or the water content of the lubricant oil.

FIGS. 1 and 2 illustrate electromechanical devices in which there are two gear stages. It should be noted that the number a gear stages is not necessarily two in electromechanical devices according to different embodiments of the invention. It is possible that, in an electromechanical device according to a certain embodiment of the invention, there is only one gear stage, e.g. a planet gear stage or a cylindrical gear stage, or that there are more than two gear stages each of which can be a planet gear stage or a cylindrical gear stage. Furthermore, concerning planet gear stages, it is not necessary that the planet-wheel carrier rotates and the gear ring is stationary as in the exemplifying construction illustrated in FIG. 1. It is also possible that the gear ring is rotating. It should be also noted that the present invention is not limited to the use of permanent magnet electrical machines. The electrical machine that is integrated with the gear system can be an electrically magnetized electrical machine as well.

The specific examples provided in the description given above should not be construed as limiting. Therefore, the invention is not limited merely to the embodiments described above.

The invention claimed is:

1. An electromechanical device comprising:
a mechanical interface structure for connecting to an external rotating element,
an electrical machine, and
one or more gear stages on a mechanical power transmission path between the mechanical interface structure and a rotor of the electrical machine,
wherein the rotor of the electrical machine is supported by a frame of the gear stage directly connected to the rotor,
wherein the device comprises two or more gear stages, and a stator of the electrical machine is supported by a frame of another of the gear stages not directly connected to the rotor,
wherein the one or more gear stages consists of:
a first planet-gear stage and a second planet-gear stage,
a planet-wheel carrier of the first planet-gear stage constituting a part the mechanical interface structure,
a sun gear shaft of the first planet-gear stage being connected to a planet-wheel carrier of the second planet-gear stage, and
a sun gear shaft of the second planet-gear stage being connected to the rotor of the electrical machine.

2. The electromechanical device according to claim 1, wherein the frame of the device comprises mechanical structures and a stationary gear ring forming the frame of the gear stage directly connected to the rotor.

3. The electromechanical device according to claim 1, wherein the rotor of the electrical machine is supported by a mechanical structure which is connected fixedly to the frame of the gear stage connected to the rotor, and the rotor is connected rotatably to the mechanical structure.

4. The electromechanical device according to claim 3, wherein the rotatable connection between the mechanical structure and the rotor of the electrical machine comprises bearings.

5. The electromechanical device according to claim 3, wherein the mechanical structure comprises lubricant oil channels for connecting lubrication of the rotor of the electrical machine and the lubrication of the gear stage directly connected to the rotor.

6. The electromechanical device according to claim 1, wherein the rotor of the electrical machine is connected to the sun gear shaft of the second planet-gear stage with a coupling having grip which is lost as a response to a situation in which torque acting over the coupling exceeds a pre-determined limit value.

7. The electromechanical device according to claim 1, wherein the electromechanical device is a wind turbine.

* * * * *